United States Patent [19]
Zimmerman

[11] Patent Number: 5,929,448
[45] Date of Patent: Jul. 27, 1999

[54] REDUNDANT TRANSISTOR DOSE MONITOR CIRCUIT USING TWO ICS

[75] Inventor: David Zimmerman, Sarasota, Fla.

[73] Assignee: The United States of America as represented by the Secretary of the Air Force, Washington, D.C.

[21] Appl. No.: 08/937,247

[22] Filed: Sep. 3, 1997

[51] Int. Cl.[6] .................................................. G01T 1/26
[52] U.S. Cl. ................................. 250/370.07; 250/370.14
[58] Field of Search .......................... 250/370.14, 370.07

[56] References Cited

U.S. PATENT DOCUMENTS

| | | |
|---|---|---|
| 3,614,444 | 10/1971 | Nirschl et al. . |
| 3,654,468 | 4/1972 | Shah . |
| 4,983,840 | 1/1991 | Ouvrier-Buffet et al. . |
| 5,309,085 | 5/1994 | Sohn . |
| 5,332,903 | 7/1994 | Buehler et al. ................. 250/370.14 |

*Primary Examiner*—Constantine Hannaher
*Attorney, Agent, or Firm*—William G. Auton

[57] ABSTRACT

A total dose monitor circuit consists of three P-channel MOSFET devices packaged in a CD4007 device and an OP490 bipolar quad operational ampher used to measure and average the sensor outputs. The P-channel transistors in the CD4007 device are used as the total dose sensors in this circuit. MOS transistors are sensitive to total dose degradation and this sensitivity can be exploited in a dose monitoring circuit. The gate threshold voltage, VGS, will shift negatively as a function of total dose exposure due to the trapped charges that build up in the gate interface during ionizing radiation exposure. The threshold voltage shift is directly proportional to the total dose exposure level.

3 Claims, 1 Drawing Sheet

REDUNDANT TRANSISTOR DOSE MONITOR CIRCUIT USING TWO ICS

STATEMENT OF GOVERNMENT INTEREST

The invention described herein may be manufactured and used by or for the Government for governmental purposes without the payment of any royalty thereon.

BACKGROUND OF THE INVENTION

The invention relates generally to dose monitor circuitry, and more specifically, it relates to a means of measuring the total ionizing radiation dose using silicon solid state devices.

Past implementations of total ionizing radiation dose measurement circuits have relied on Geiger-Mueller tubes, thermoluminescent devices (TLD's), and/or single silicon detector devices. Geiger-Mueller tubes and TLD's have many disadvantages not necessary to discuss here, Detectors using silicon devices such as diodes and P-channel metal oxide semiconductor (PMOS) transistors have been implemented in the past. Diode detectors are typically insensitive to total ionizing radiation dose at levels of interest for characterizing semiconductor degradation. Thus, a diode detector is not usually capable of accurately measuring low total dose levels with good resolution. PMOS transistor implementations of total ionizing radiation dose measurement circuits are typically encountered in applications requiring nigh accuracy, low total dose measurement. Past art used PMOS transistors for the sensor element and biased the transistor using a constant current source tied to the source of the transistor and connected the gate and the drain of the transistor to ground. By measuring the voltage appearing at the source input of the transistor, a direct reading of the gate threshold voltage could be made. The problem with this implementation of the total dose sensing element is three-fold.

First, the PMOS transistors bias voltage is changing dynamically as it is exposed to ionizing radiation. This is an undesirable condition because the total dose response of a PMOS transistor to ionizing radiation exposure is linear only if the electric field across the device remains constant. This obviously is not the case with past art.

The second deficiency in past art is the reliance on a constant current source to bias the PMOS transistor. Constant current sources used in past art typically degrade as a function of total ionizing radiation dose exposure. This makes the constant current vary with dose exposure and invalidates any calibration performed on the PMOS transistor for total dose response at the nominal constant current set-point.

The third deficiency in past art is the dependence in the measurement output on the load appearing at the source terminal of the PMOS transistor. Any load appearing at the source of the transistor will; a) vaiy the current going into the transistor because some current is shunted into the load, and b) as a result the electric field across the device is not constant.

The task of providing dose monitor circuitry is alleviated by the following U.S. Patents, the disclosures of which are incorporated herein by reference:

U.S. Pat. No. 3,614,444 issued to Nirshl;
U.S. Pat. No. 3,654,468 issued to Shah;
U.S. Pat. No. 4,983,840 issued to Ouvrier-Buffet et al; and
U.S. Pat. No. 5,309,085 issued to Sohn.

The four references disclose alternative measuring circuits that are improved by the present invention.

SUMMARY OF THE INVENTION

The present invention is a total dose monitor circuit. The circuit consists of three P-channel MOSFET devices packaged in a CD4007 device and an OP490 bipolar quad operational amplifier used to measure and average the sensor outputs.

The P-channel transistors in the CD4007 device are used as the total dose sensors in this circuit. MOS transistors are sensitive to total dose degradation and this sensitivity can be exploited in a dose monitoring circuit. The gate threshold voltage, VGS, will shift negatively as a function of total dose exposure due to the trapped charges that build up in the gate interface during ionizing radiation exposure. The threshold voltage shift is directly proportional to the total dose exposure level.

The gate threshold voltace is measured by placing the gate and drain of the P-channel transistor in the non-inverting feedback loop of the OP490. The source connection of the transistor is connected to the power supply voltage, Vcc. A resistor, R3, is connected from the drain of the transistor to ground and is used as a current sensing element. The inverting input of the OP490 is connected to a voltage reference set by the voltage divider represented by resistors R1 and R2. The voltage appearing at the inverting input of the op-amp created by the voltage divider, is selected such that the current flowing through the transistor into R3 creates the same voltage level. This reference voltage ensures that a constant current flows through the P-channel transistor at all times and causes the output of the OP490 to adjust the gate voltage of the transistor so that this constant current flows continuously through the transistor.

It is an object of the present invention to provide a means of measuring the total ionizing radiation dose using silicon solid state devices, i.e., integrated circuits.

It is a further purpose of this invention to measure the ionizing radiation dose to extreme levels without the radiation dose significantly affecting the performance of the measurement circuit, i.e., a radiation hardened implementation of the measurement circuit.

A further purpose of the invention is to implement a ionizing radiation measurement circuit that averages several radiation sensor outputs so that dependence on a single measurement is minimized.

These objects will become clearer in view of the description provided below.

DESCRIPTION OF THE PREFERRED EMBODIMENT

The circuit implementation of the invention serves to rectify the deficiencies in the past art. A constant voltage is applied to the source input of a PMOS transistor and the current flowing into the transistor is sensed by a resistor connected between the drain of the transistor and ground. A bipolar operational amplificr (OP490) is used to sense the voltage across this sense resistor and to adjust the gate voltage of the PMOS transistor to cause the set-point current to flow by comparing the drain resistor voltage to a reference voltage appearing at the second input to the operational amplifier. Three PMOS transistors packaged in a single IC (CD4007) are used as the radiation sensors and the respective outputs are averaged together by a second stage op-amp circuit to yield an averaged voltage output proportional to the total radiation dose exposure.

This implementation serves to minimize the variability in transistor electric field, decrease the reliance on a single sensor element and alleviate the load sensitivity of the measurement output.

Figure 2:
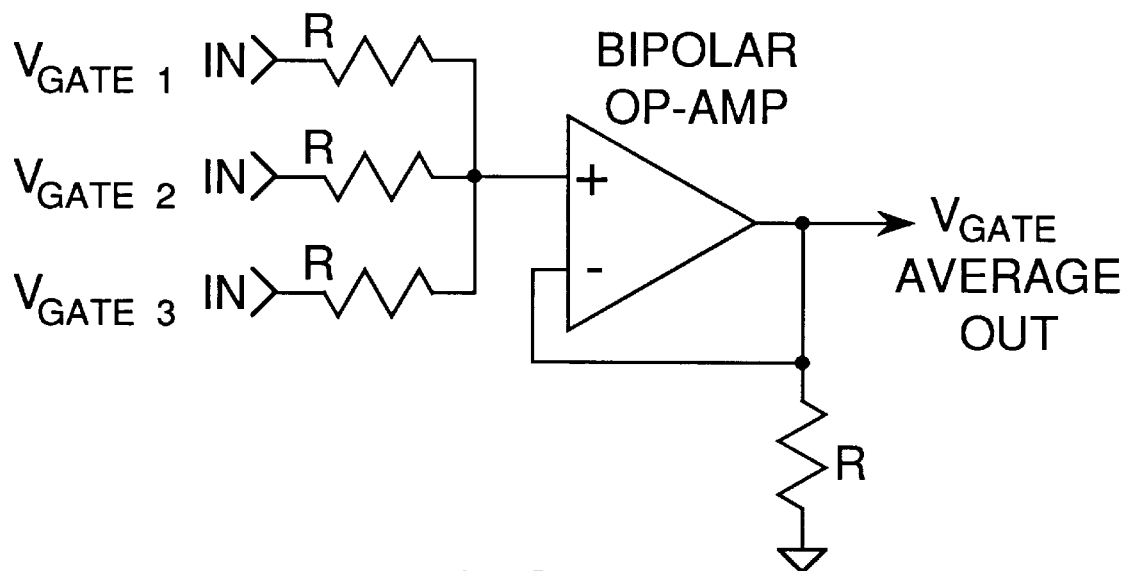

FIG. 2 shows a schematic representation of the total dose monitor circuit. The circuit consists of P-channel MOSFET devices packaged in a CD4007 device and an OP490 bipolar quad operational amplifier used to measure and average the sensor outputs.

The P-channel transistors in the CD4007 device are used as the total dose sensors in this circuit. MOS transistors are sensitive to total dose degradation and this sensitivity can be exploited in a total dose monitoring circuit. The gate threshold voltage, VGS, will shift negatively as a function of total dose exposure due to the trapped charges that build up in the gate interface during ionizing radiation exposure. The threshold voltage shift is directly proportional to the total dose exposure level.

Figure 1:
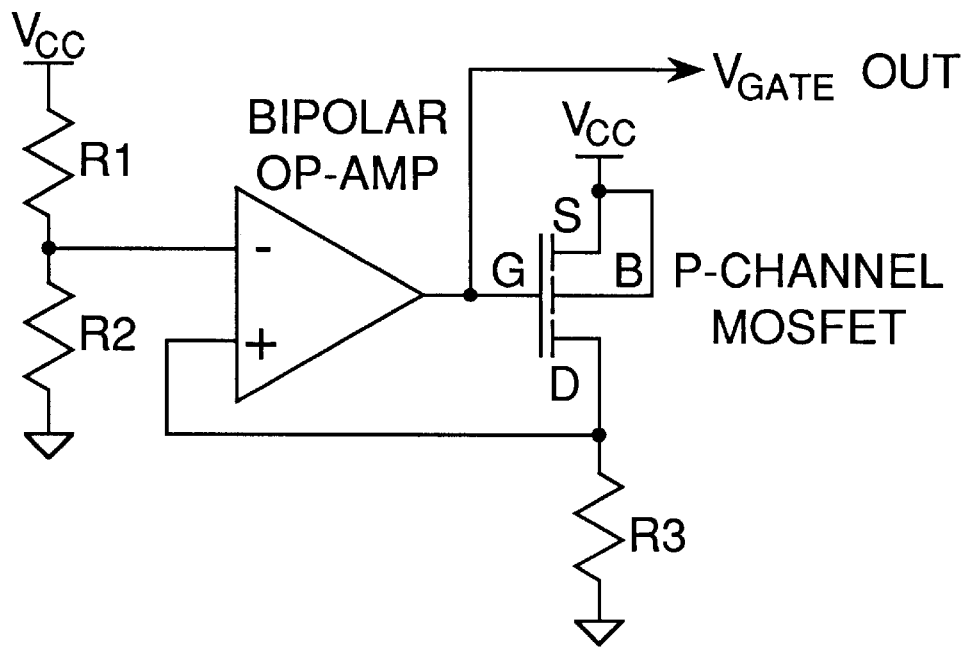
FIGS. 1 and 2 present two views of the present invention.

The gate threshold voltage is measured by placing the gate and drain of the P-channel transistor in the non-inverting feedback loop of the OP490, as shown in FIG. 1. The source connection of the transistor is connected to the power supply voltage, Vcc. A resistor, R3, is connected from the drain of the transistor to ground and is used as a current sensing element. The inverting input of the OP490 is connected to a voltage reference set by the voltage divider represented by resistors R1 and R2. The voltage appearing at the inverting input of the op-amp created by the voltage divider, is selected such that the current flowing through the transistor into R3 creates the same voltage level. This reference voltage ensures that a constant current flows through the P-channel transistor at all times and causes the output of the OP490 to adjust the gate voltage of the transistor so that this constant current flows continuously through the transistor.

The output of the total dose monitoring circuit of FIG. 2 is an analog voltage level which changes proportional to the total dose exposure level. The three total dose sensor outputs are summed and averaged in the second stage of the dose monitor circuit. This stage of the circuit consists of three input summing resistors, one for each dose sensor circuit stage, and an OP490 opamp connected in a non-inverting unity gain voltage follower configuration. This stage of the circuit will measure and average the three total dose sensor voltages and output an analog voltage level that represents the average of the three total dose sensor outputs. This analog output voltage is directly proportional to the average total dose measured in FIG. 2 by the three dose sensors.

The advantages and new features of the invention have-been alluded to in the preceding sections. They are specifically:

1) Constant bias voltage creates a constant electric field across the device and therefore the PMOS transistor radiation sensor has a linear response to radiation exposure.
2) Multiple PMOS radiation sensors are packaged in a single IC allowing for minimum circuit size and weight. Multiple PMOS sensors also allows for redundant operation,
3) Bipolar operational amplifier control and measurement circuit minimizes measurement circuit sensitivity to total ionizing radiation dose degradation.

Increased accuracy is assured because only the PMOS sensors are affected by total dose exposure.

4) Dependence and variability in voltage output due to circuit loads is eliminated in the invention.
5) The complete circuit is implemented using only two (2) IC's and nine (9) resistors.

Several alternative forms of the invention can be implemented. Susceptibility to power supply voltage fluctuations can be eliminated by using zener voltage reference diodes to provide reference voltage to the PMOS transistor instead of using Vcc. A zener reference diode may also be used instead of the resistive voltage divider (see FIG. 1) as the reference voltage set-point for the op-amp input used to compare the voltage developed across the transistor drain output resistor.

The CD4007 also has three NMOS transistors contained in the same IC package. NMOS transistors are typically more sensitive to total dose radiation exposure than PMOS transistors. These devices can be connected to a second measurement circuit to be used as a cross-check of the output from the PMOS transistor measurement circuit. The only difference between the two outputs would be the rate at which the voltage changes versus total dose exposure.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A transistor dose monitor circuit for measuring ionizing radiation levels which comprises:
    a constant voltage source which produces a constant voltage signal;
    a P-channel metal oxide amplifier which produces a measurement signal in response to incident ionizing radiation and the constant voltage signal, the measurement signal being an indication of the ionizing radiation levels, but having fluctuation caused by dynamic chances in the measurement signal in response to the ionizing radiation; and
    a means for damping the dynamic changes in the measurement signal so that the fluctuations are eliminated, wherein the P-channel metal oxide amplifier has a gate terminal which produces a measurement signal, and wherein the damping means comprises a averaging amplifier which is electrically connected between the gate terminal of the P-channel metal oxide amplifier and the constant voltage source to damp the dynamic changes in the measurement signal so that the fluctuations are eliminated by averaging signals at the gate terminal, wherein the averaging amplifier comprises a bipolar operational amplifier.

2. A transistor dose monitor circuit, as defined in claim 1, wherein said bipolar operational amplifier comprises:
    first and second input resistors which are electrically connected an a series circuit between said constant voltage source and a common electrical ground;
    a bipolar operational transistor having an inverting input terminal, an input terminal and an output terminal, said inverting input terminal being connected to a node between the first and second input resistors to receive a constant input voltage, said output terminal being connected to the P-channel metal oxide amplifier to output a balancing signal to counter the fluctuations in the measurement signal.

3. A transistor dose monitor circuit for measuring ionizing radiation levels which comprises:
    a constant voltage source which produces a constant voltage signal;
    a P-channel metal oxide amplifier which produces a measurement signal in response to incident ionizing radiation and the constant voltage signal, the measurement signal being an indication of the ionizing radiation levels, but having fluctuation caused by dynamic changes in the measurement signal in response to the ionizing radiation; and a means for damping the dynamic changes in the measurement signal so that the fluctuations are eliminated, wherein the P-channel metal oxide amplifier has a gate terminal which produces a measurement signal, and wherein the damping means comprises a averaging amplifier which is electrically connected between the gate terminal of the P-channel metal oxide amplifier and the constant voltage source to damp the dynamic changes in the measurement signal so that the fluctuations are eliminated by averaging signals at the gate terminal, wherein said P-channel metal oxide amplifier comprises:

a P-channel metal oxide transistor having a source terminal, a gate terminal, a drain terminal and a fourth terminal, said source and fourth terminals being connected to said constant voltage source; and a sensing resistor which is connected between the drain terminal and a common electrical ground.

* * * * *